United States Patent
Reinhart et al.

(10) Patent No.: US 7,034,874 B1
(45) Date of Patent: Apr. 25, 2006

(54) AUTOMATIC BAD PIXEL CORRECTION IN IMAGE SENSORS

(75) Inventors: Craig C. Reinhart, Moorpark, CA (US); Manjunath S Bhat, Westlake Village, CA (US); David Standley, Westlake Village, CA (US)

(73) Assignee: Biomorphic VLSI, INC, Thousand Oaks, CA (US)

( * ) Notice: Subject to any disclaimer, the term of this patent is extended or adjusted under 35 U.S.C. 154(b) by 0 days.

(21) Appl. No.: 10/459,092

(22) Filed: Jun. 11, 2003

Related U.S. Application Data

(60) Provisional application No. 60/455,168, filed on Mar. 17, 2003, provisional application No. 60/455,183, filed on Mar. 17, 2003.

(51) Int. Cl.
*H04N 9/64* (2006.01)
*H04N 3/14* (2006.01)
*H04N 5/335* (2006.01)
*H04N 9/04* (2006.01)
*H04N 9/083* (2006.01)

(52) U.S. Cl. .................... 348/246; 348/280
(58) Field of Classification Search ........ 348/245, 348/246, 241–247; 382/254, 266; 345/611, 345/616
See application file for complete search history.

(56) References Cited

U.S. PATENT DOCUMENTS

| | | | | |
|---|---|---|---|---|
| 5,198,906 | A * | 3/1993 | Yamashita | 348/246 |
| 5,381,175 | A * | 1/1995 | Sudo et al. | 348/246 |
| 5,499,114 | A * | 3/1996 | Compton | 358/483 |
| 5,805,216 | A * | 9/1998 | Tabei et al. | 348/246 |
| 5,832,117 | A | 11/1998 | Harris et al. | 382/223 |
| 5,881,182 | A * | 3/1999 | Fiete et al. | 382/275 |
| 6,496,604 | B1 * | 12/2002 | Bricourt | 382/254 |
| 6,618,084 | B1 * | 9/2003 | Rambaldi et al. | 348/247 |
| 2002/0122123 | A1 * | 9/2002 | Kimura | 348/246 |
| 2002/0158977 | A1 * | 10/2002 | Hamilton, Jr. | 348/246 |

* cited by examiner

*Primary Examiner*—Ngoc-Yen Vu
*Assistant Examiner*—Kelly Jerabek
(74) *Attorney, Agent, or Firm*—Tejinder Singh, Klein, O'Neill & Singh, LLP

(57) ABSTRACT

A method and system for automatic bad pixel correction in image sensors is provided. The process includes identifying outlier pixels, identifying bad pixels, and performing bad pixel correction. Bad pixels are identified by comparing pixels in a single row or more than one row. A bad pixel value is replaced by a pixel value that depends on the pixel value of non-bad pixels located next to the bad pixel. The system includes means for identifying outlier pixels, means for identifying bad pixels, and means for performing bad pixel correction.

4 Claims, 6 Drawing Sheets

| | | | | | | | | | |
|---|---|---|---|---|---|---|---|---|---|
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |

FIGURE 1 (Prior Art)

AUTOMATIC BAD PIXEL CORRECTION IN IMAGE SENSORS

CROSS REFERENCE TO RELATED APPLICATION

This patent application is related to the provisional patent applications filed on Mar. 17, 2003, Ser. Nos.:60/455,168; and 60/455,183; entitled "Automatic Bad Pixel Correction in CMOS Image Sensors" and "Pixel Bus Signaling Scheme For CMOS Image Sensors With Embedded Processing", respectively; and Ser. No.:10/459,266 entitled "METHOD AND SYSTEM FOR PIXEL BUS SIGNALING IN CMOS IMAGE SENSORS", filed on even date herewith. The disclosure of the foregoing applications are incorporated herein by reference in their entirety.

BACKGROUND OF THE INVENTION

1. Field of the Invention

This invention relates to image processing, and more particularly, to automatic bad pixel correction in image sensors.

2. Background

Digital cameras are commonly used today. Typically, a digital camera uses a sensor that converts light into electrical charges. Image sensors consist of an array of detectors and each detector converts light to an electronic signal. Image sensors also include the means to scan 2-D data to an output port of the digital camera.

There are two kinds of image sensors that are currently used in digital cameras. These are based on CCD and CMOS technologies. CCD sensors combine the tasks of light conversion and array transfer in a single device using a MOS Capacitor. CMOS sensors rely on diodes or transistors to convert light into electrical signals and include switches and amplifiers in the pixel to transmit data.

To represent a high quality color image, each pixel in a pixel array must contain tri-stimulus color data (for example, red, green, and blue). Generating such data in a digital camera requires that each light detector location in an image sensor produce data for three colors. Such a system is quite complex and expensive to build. To reduce system complexity, color image sensors commonly used in digital cameras (both video and still) use a mosaic pattern of single colored light detectors, typically red, green and blue. Each detector location produces only one of the three required colors.

FIG. 1 depicts one such mosaic pattern 100, commonly referred to as a "Bayer pattern". In pattern 100, each detector location collects red (R) 103, green (G) 101, or blue (B) 102 light. Green light detectors (101) are more abundant than red (103) and blue (102) detectors to match the characteristics of human visual system. To create a full color image the two "missing colors" at each location are inferred through an interpolation process using data from neighboring detector locations. This data is further processed through a color reconstruction algorithm to make a presentable picture.

FIG. 3 shows a flow diagram of various process steps (S300 to S309, including S302A) that occur in conventional image processing systems. Based on auto-focus step S302B, an image sensor detects pixel values in step S300. In step S301, a dark current value is subtracted to reduce the noise introduced by the image sensor. In step S302, bad pixel correction is performed by an image-processing unit, and white balancing occurs in step S303. Note that bad pixel correction is applied to Bayer image (FIG. 1) readout after dark current compensation. Also, the correction is applied before color interpolation to avoid spreading bad pixel values during the interpolation process.

In step S304, color interpolation is performed. In step S305, black level flare correction is performed, and then color correction is performed in step S306. In step S307, gamma correction is performed, and edge enhancement is performed in step S308. In step S309, color space conversion occurs and then compression unit 206 compresses image data.

Pixel detectors for CMOS imagers are initially biased in a reverse direction. The carriers produced by photons discharge the reverse bias. Detector voltages after exposure are a measure of the intensity of light incident on a particular detector. All pixels should produce equal output if uniform light is used to illuminate an ideal image sensor. However, in real devices some pixels produce a higher or lower output voltage than the average value produced by the image sensor. Pixels in an image created by the image sensor that appear brighter than the rest are often described as "hot or white" pixels. Pixels whose output is below an average value are often referred to as "cold or dark" pixels. Both hot and cold detectors produce blemishes in image data and are referred to as "Bad Pixels" herein.

Bad pixels can occur in image sensors due to a number of reasons including, but not limited to, point defects in material used to fabricate the pixel array, higher leakage current at a certain pixel, and defects in the readout circuitry.

Conventional techniques for correcting bad pixels rely on developing and storing a bad pixel map for each sensor. Such data maps are collected during production of digital cameras, for each sensor. For example, a bad pixel map can be obtained by spotting the pixels that shine when no light is incident and pixels that do not saturate even if bright light is shined on them for an extended period of time. The combined map is then stored in a non-volatile memory. Data processing elements in a digital camera with this type of circuitry replace bad pixel data by estimates of what it should be. However, one limitation is that the number of locations that can be stored in the memory device limits the number of pixels, which can be corrected in this type of system. In addition, this is an expensive and time-consuming process during production and hence commercially undesirable.

Therefore, there is a need for a system and method for efficiently performing bad pixel correction.

SUMMARY OF THE INVENTION

In one aspect of the present invention, a method for detecting and correcting bad pixels without a bad pixel map is provided. Bad pixels are detected and corrected automatically during image readout. This saves cost and improves overall performance of an image sensor.

In one aspect of the present invention a method for automatic bad pixel correction in image sensors is provided. The process includes, identifying outlier pixels; identifying bad pixels; and performing bad pixel correction. Bad pixels are identified by comparing pixels in a single or more than one row. A bad pixel value is replaced by a pixel value that depends on the pixel value of non-bad pixels located near the bad pixel.

In yet another aspect, a digital camera system is provided that includes means for identifying outlier pixels; means for identifying bad pixels; and means for performing bad pixel correction.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit, the invention. The drawings include the following Figures:

FIG. 1 shows a block diagram of a Bayer Mosaic image pattern, used according to one aspect of the present invention;

DETAILED DESCRIPTION OF THE PREFERRED EMBODIMENTS

To facilitate an understanding of the preferred embodiment, the general architecture and operation of a digital camera system will be described. The specific architecture and operation of the preferred embodiment will then be described with reference to the general architecture of the digital camera system.

Overall System

Figure 2:
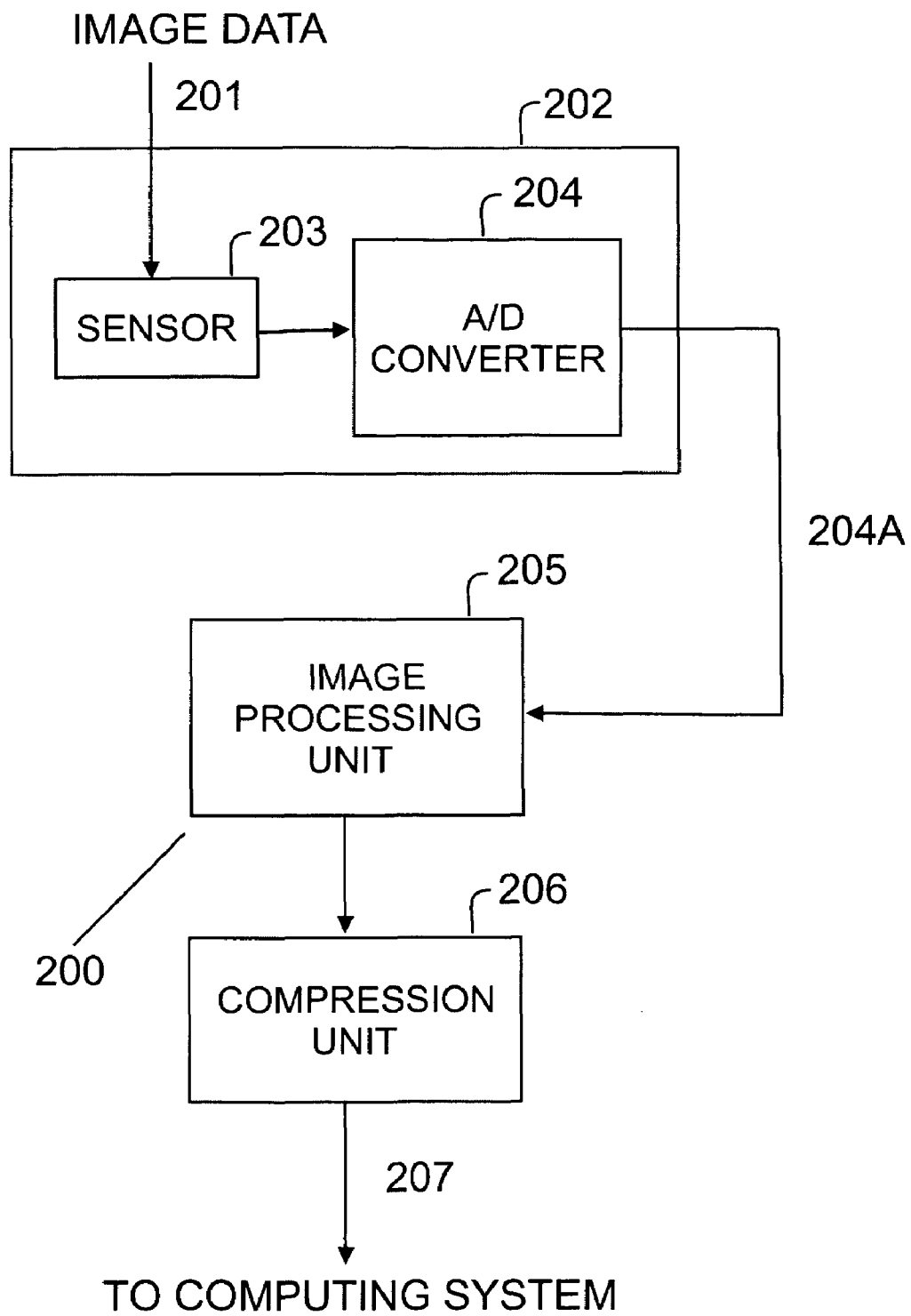
FIG. 2 is a block diagram of a digital camera system used according to one aspect of the present invention.
Figure 3:
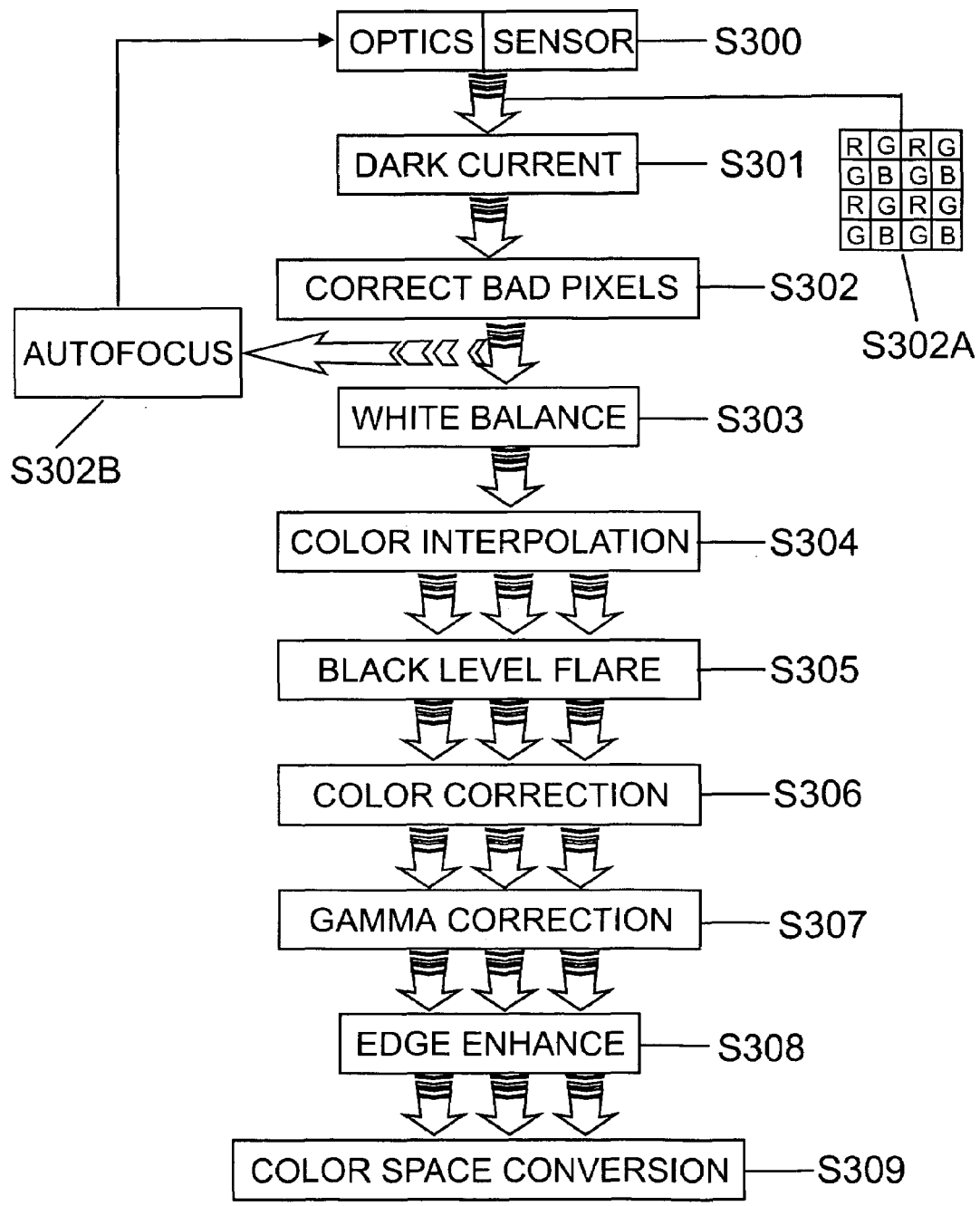
FIG. 3 is a top-level flow diagram showing various process steps involved in image processing.

FIG. 2 shows a block diagram of a digital camera system 200 that receives image data 201 via image capturing unit 202. Image capturing unit 202 includes an image sensor 203 and analog/digital (A/D) converter 204. Image sensor 203 captures raw pixel values of images as analog data, which is converted into digital data by A/D converter 204. Digital image data 204A is then sent to an image-processing unit 205 and thereafter to a compression unit 206. Compression unit 206 may include a processor or specialized ASIC to compress data. Compressed image data 207 is then sent to a computing system (not shown) for viewing and/or processing.

The foregoing only provides a top-level description of a digital camera system. As is well known in the art, flash memory may be used by the digital camera system to store images. Also, the various units on FIG. 2 may be included on a single chip or embedded microprocessor.

Outlier Pixel: Before describing the adaptive aspects of the present invention, the following defines an "outlier" pixel as used in the various adaptive aspects of the present invention. An outlier pixel has either greater or lesser intensity than its neighboring pixels of the same color in the same row based on a given threshold value. An outlier pixel value is either more than both the adjacent pixels or less than both adjacent pixels by an amount more than a defined threshold value.

Figure 4:
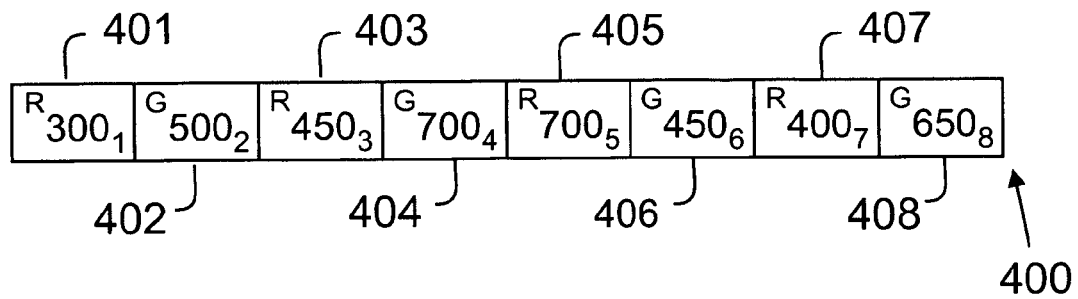
FIG. 4 shows an example of an outlier pixel, as used in various adaptive aspects of the present invention.

FIG. 4 shows a row 400 with pixels 401–408 and contains an example of an outlier pixel. R denotes red, G denotes green and B denotes blue. Assume that the threshold for a red pixel is 100 and green threshold is 150. Even though $R_3$ 403 differs from its neighbors $R_1$ 401 and $R_5$ 405 by more than 100 it is still not an outlier pixel because $R_3$ 403 is greater than $R_1$ 401 and less than $R_5$ 405. $G_4$ 404 is an outlier pixel because its pixel value, 700, is greater than both $G_2$ 402 (pixel value 500) and $G_6$ 406 (pixel value 450) by more than the green threshold (150).

It is possible to define outliers to be the pixels whose value is strictly greater than that of their neighbors. This is called a "one sided" outlier. In this case, $G_4$ 404 would be an outlier, whereas $G_6$ 406 won't be an outlier (by prior definition).

Figure 5:
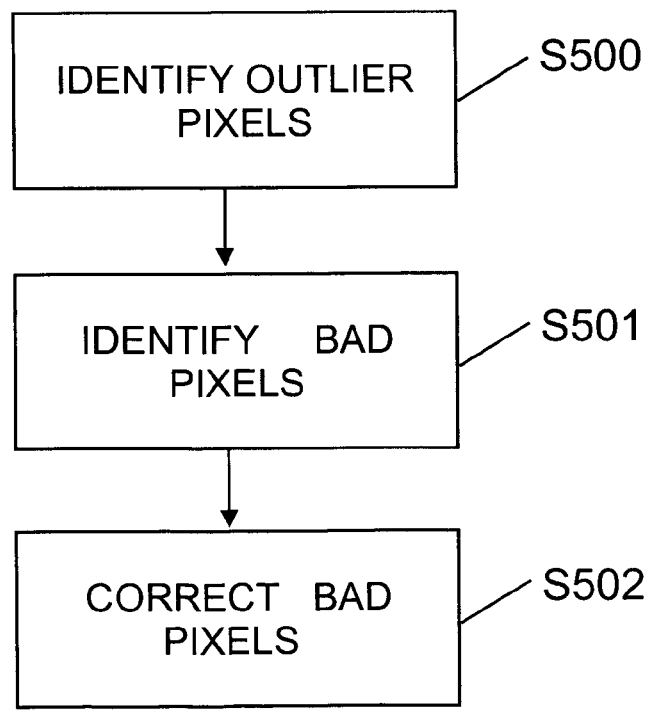
FIG. 5 shows a flow diagram for bad pixel detection and correction, according to one aspect of the present invention.
Figure 6:
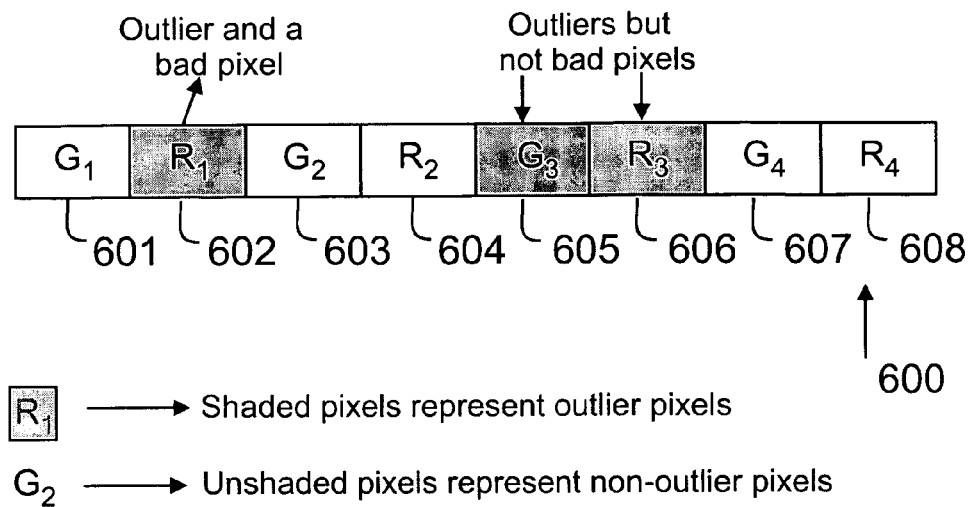
FIG. 6 shows an example of a 1-D method used for bad pixel detection, according to one aspect of the present invention.

FIG. 5 shows a flow diagram of process steps for bad pixel correction, according to one aspect of the present invention without using bad pixel map. In step S500, the process identifies outlier pixels. However, all outlier pixels may not be all bad pixels. This is because an outlier pixel can be part of a thin line (e.g. two pixel wide) in an image as it registers two different colors, for example. So in step S501, all the bad pixels are detected. Various methods may be used to detect the bad pixels among the outlier pixels as described below:

1-D Method: In this process the bad pixels are determined by comparing pixels on the same row. FIG. 6 shows an example of a row 600 of pixels 601–608. Pixels 602, 605 and 606 are outlier pixels. In this method, a pixel is bad if it is an outlier and its adjacent pixels on the left and right are not outliers. For example, pixel 602 is an outlier pixel and a bad pixel, while pixels 605 and 606 are outliers but not bad pixels.

Figure 7:
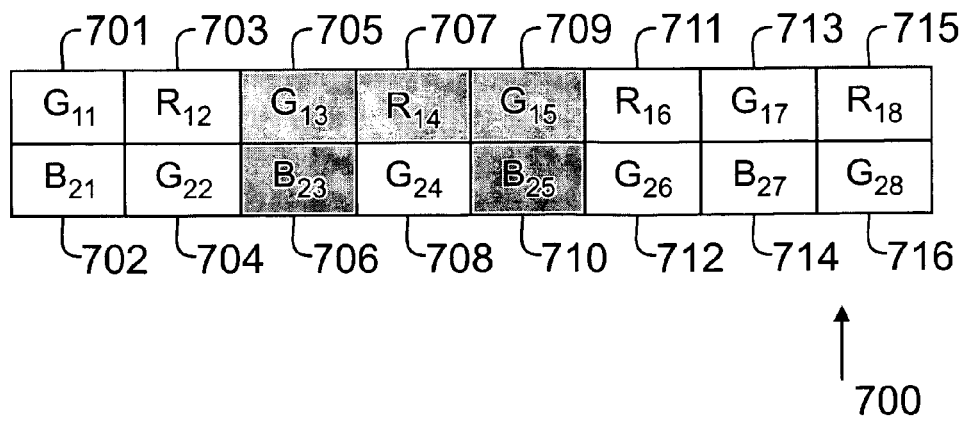
FIG. 7 shows an example of a 2-D method used for bad pixel detection, according to one aspect of the present invention.

2-D Method: In this pixel, more than one row is considered for determining a bad pixel. A pixel will be a bad pixel if the pixel is outlier and pixels on the left, right, top and bottom are not outliers. FIG. 7 shows rows 700 with pixels 701–716. Pixel 708 will be bad if pixel 708 is an outlier and none of pixels 705, 707, 709, 710 and 706 are outliers.

Figure 8:
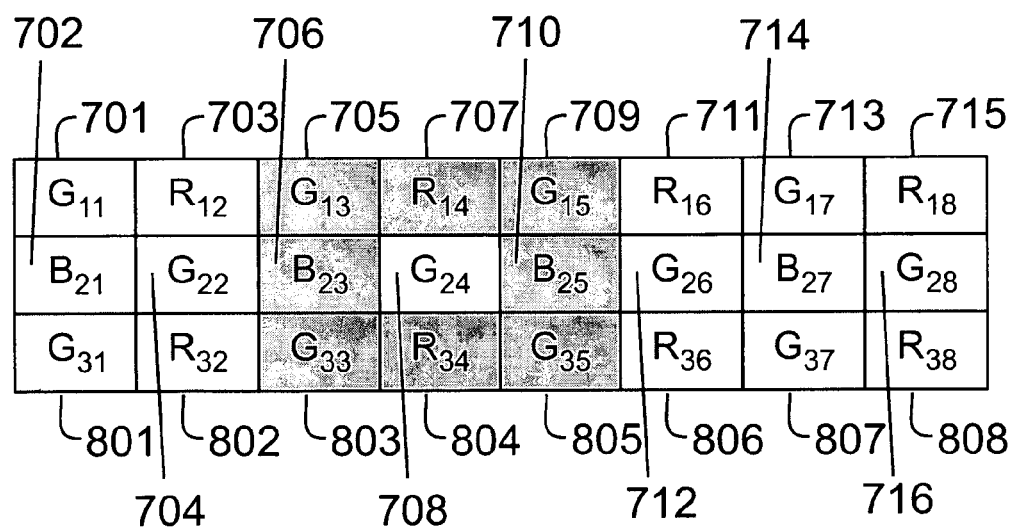
FIG. 8 shows an example of a 2-D+ method used for bad pixel detection, according to one aspect of the present invention.

2-D+ Method: In this method, the outlier status of adjoining pixels of a lower row is used for bad pixel detection. An example of this is shown in FIG. 8 with pixels 801–808. For example, for $G_{24}$ 708 to be a bad pixel it must be an outlier and none of pixels $G_{13}$ 705, $R_{14}$ 707, $G_{15}$ 709, $B_{23}$ 706, $B_{25}$ 710, $G_{33}$ 803, $R_{34}$ 804 and $G_{35}$ 805 should be outliers.

It is noteworthy that the present invention is not limited to the foregoing bad pixel detection techniques. Any other bad pixel detection technique may be used in the adaptive aspects of the present invention.

In step S502, the process replaces bad pixel values. In one aspect the process assumes that the variation of good pixel values is minimal as located among bad pixels. Hence, the ratio of adjacent pixels of different color is the same. Applying this principle, in FIG. 7, if $G_{24}$ 708 is a bad pixel, then $$\frac{G_{24\_new}}{B_{25}} = \frac{G_{26}}{B_{27}} \quad (I)$$

where $G_{24\_new}$ is the replacement for the bad pixel $G_{24}$.

Hardware implementation of the division operation can be expensive for both pixel area and power resources. In one aspect, the above division can be replaced by subtraction using the following:

$$\frac{G_{24\_new} - B_{25}}{B_{25}} = \frac{G_{26} - B_{27}}{B_{27}}$$

assuming $B_{25}$ to be close to $B_{27}$. Hence, $$G_{24\_new} - B_{25} = G_{26} - B_{27}$$

It is noteworthy that the foregoing process steps can be performed by image processing unit 205. Also, the foregoing process may be used in a CMOS or CCD sensor. In one aspect of the present invention, a method for detecting and correcting bad pixels without a bad pixel map is provided. Bad pixels are detected and corrected automatically during image readout. This saves cost and improves overall performance of an image sensor.

Although the present invention has been described with reference to specific embodiments, these embodiments are illustrative only and not limiting. Many other applications and embodiments of the present invention will be apparent in light of this disclosure and the following claims.

What is claimed is:

1. A method for bad pixel correction in image sensors, comprising:

identifying an outlier pixel in a single frame, wherein the outlier pixel has greater or lower intensity value than its neighboring pixels of same color and in a same row based on a threshold value;

identifying a bad pixel by comparing an outlier pixel to adjacent pixels, since not all outlier pixels are bad pixels including an outlier pixel that is a part of a thin line which is two pixel wide, wherein the bad pixel is an outlier pixel located between non-outlier pixels in one or more than one row of pixels; and performing bad pixel correction automatically without using a bad pixel map, wherein a bad pixel value is replaced by a pixel value that depends on a ratio of a difference of pixel values for pixels neighboring the identified bad pixels.

2. The method of claim 1, wherein a bad pixel may be determined using more than one row of pixels.

3. A digital camera using image sensors that performs bad pixel correction, comprising:

means for identifying an outlier pixel in a single frame, wherein the outlier pixel has greater or lower intensity value than its neighboring pixels of same color and in a same row based on a threshold value;

means for identifying a bad pixel by comparing an outlier pixel to adjacent pixels, since not all outlier pixels are bad pixels including an outlier pixel that is a part of a thin line which is two pixel wide, wherein the bad pixel is an outlier pixel located between non-outlier pixels in one or more than one row of pixels; and means for performing bad pixel correction automatically without using a bad pixel map, wherein a bad pixel value is replaced by a pixel value that depends on a ratio of a difference of pixel values for pixels neighboring the identified bad pixels.

4. The digital camera of claim 3, wherein a bad pixel may be determined using more than one row of pixels.

* * * * *